Figure 1:
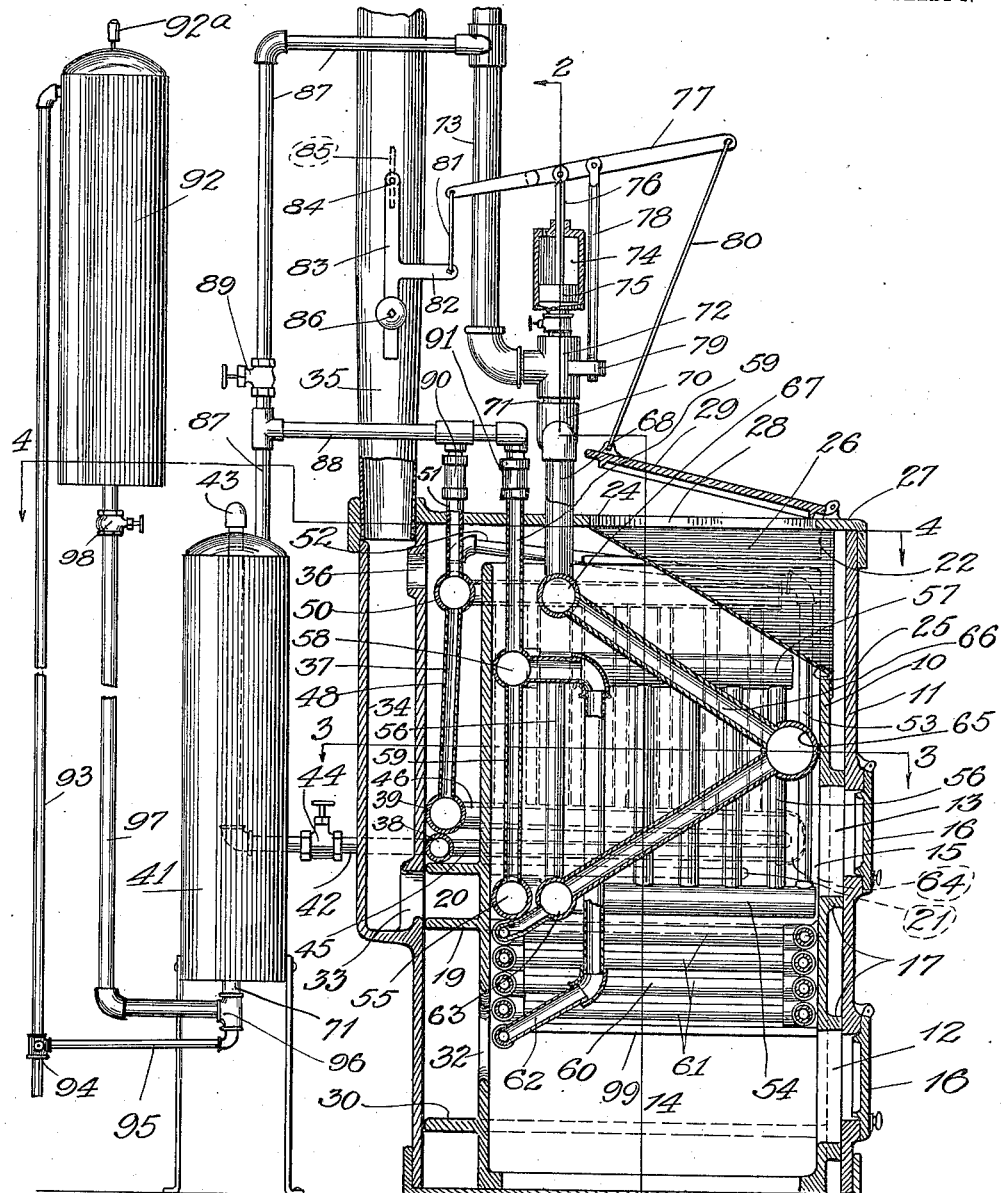

C. J. JOHNSON.
HEATING APPARATUS.
APPLICATION FILED APR. 18, 1913.

1,093,333.

Patented Apr. 14, 1914.

3 SHEETS—SHEET 1.

C. J. JOHNSON.
HEATING APPARATUS.
APPLICATION FILED APR. 18, 1913.

1,093,333.

Patented Apr. 14, 1914.

3 SHEETS—SHEET 2.

Witnesses:
M. Rosendall
A. S. Phillips

Inventor:
Charles J. Johnson
By Chas. C. Tieman

C. J. JOHNSON.
HEATING APPARATUS.
APPLICATION FILED APR. 18, 1913.
1,093,333.
Patented Apr. 14, 1914.
3 SHEETS—SHEET 3.
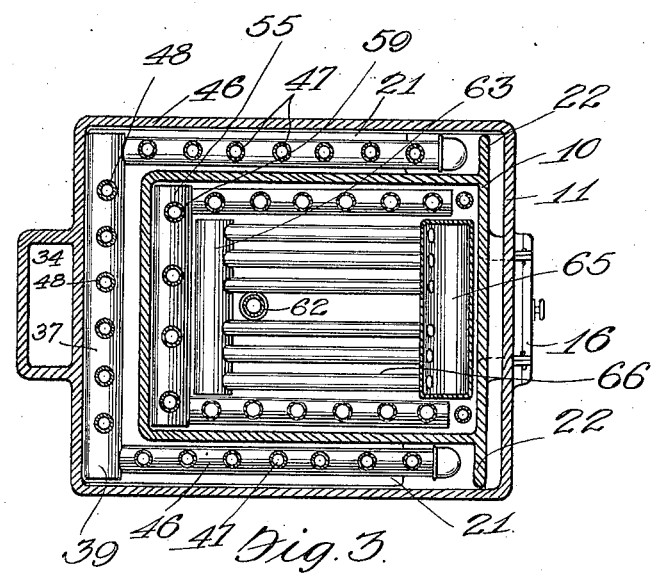
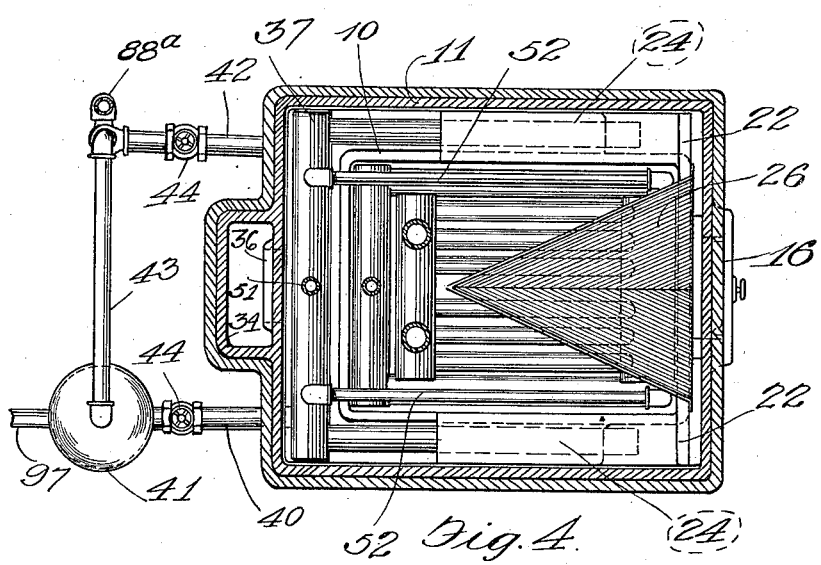

UNITED STATES PATENT OFFICE.

CHARLES J. JOHNSON, OF CHICAGO, ILLINOIS.

HEATING APPARATUS.

1,093,333.  Specification of Letters Patent.  Patented Apr. 14, 1914.

Application filed April 18, 1913. Serial No. 761,961.

*To all whom it may concern:*

Be it known that I, CHARLES J. JOHNSON, a citizen of the United States of America, residing at Chicago, in the county of Cook and State of Illinois, have invented certain new and useful Improvements in Heating Apparatus, of which the following is a specification.

This invention relates to improvements in an apparatus to be used for heating buildings, and it consists in certain peculiarities of the construction, novel arrangement and operation of the various parts thereof as will be hereinafter more fully set forth and specifically claimed.

The principal object of the invention is to provide a heating apparatus, which is adapted for producing heat, either by means of hot-water or steam, and which can be readily connected to and used in connection with steam or hot-water piping systems, already installed, thereby rendering it unnecessary, in such cases, to employ any special kind or arrangement of piping, except that used in the apparatus itself.

Another object of the invention is to furnish a heating apparatus of the above mentioned general character, which shall be so made and its parts so arranged as to utilize exhaust heat from the fuel and furnace, which heat has heretofore been wasted in heating the water as it enters the furnace, thus economizing in the amount of fuel.

Another object is to so construct the apparatus, that when used as a water heating system, there will be no dead or standing water around the fire-pot or other part of the heater, but, on the other hand, the water will be kept in continuous circulation, thereby attaining full benefit of the heat and fuel, and besides preventing cold water in the pipes surrounding or coming in close proximity to the fire to cool the same, which is one of the great faults or objections to other heaters.

A further object is to provide means for heating or warming the intake air to the furnace or casing used for draft purposes, thus supplying the heater with heated instead of cold air, which is caused to circulate through the flues of the casing or furnace in such a manner as to heat the coils, and consequently save a large amount of heat and fuel.

Still a further object is to furnish a heating apparatus which will supply heat to the upper floors of a building as well as to the lower and intermediate floors in an adequate degree or substantially uniformly.

Another object is to furnish a heater which shall be comparatively simple and inexpensive in construction, strong, durable and efficient in operation, and one that will require but little attention, or, in other words, will be practically automatic in its operation.

Other objects and advantages of the invention will be disclosed in the subjoined description and explanation.

Figure 2:
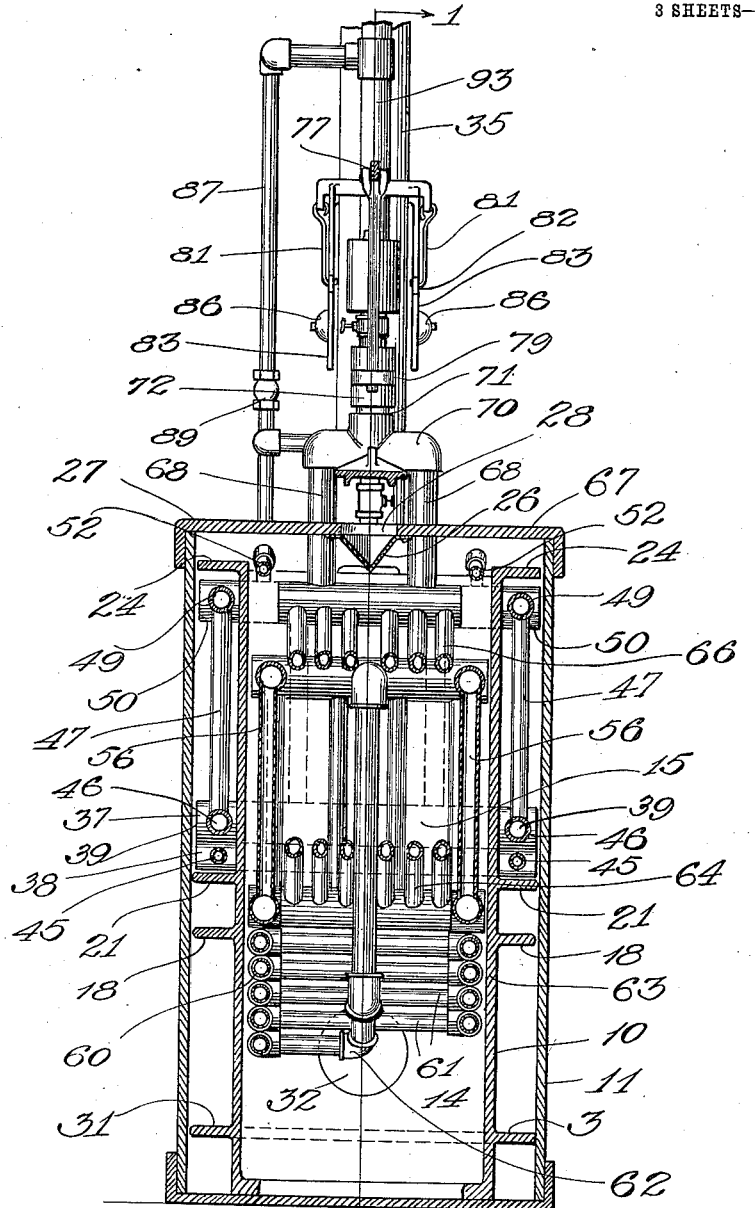

In the accompanying drawings, which serve to illustrate an embodiment of the invention—Figure 1 is a vertical sectional view taken on line 1—1 of Fig. 2, looking in the direction indicated by the arrows, but showing parts in elevation and illustrating some of the pipes shortened for the convenience of illustration; Fig. 2 is a vertical sectional view taken on line 2—2 of Fig. 1, looking in the direction indicated by the arrows; Fig. 3 is a plan sectional view taken on line 3—3 of Fig. 1 and Fig. 4 is a similar view taken on line 4—4 of Fig. 1.

Corresponding numerals of reference refer to like parts throughout the different views of the drawings.

The furnace of my heater consists of an inner casing 10, and an outer casing 11, which may be made of any suitable size, form and material, but preferably rectangular in shape, as shown in the drawings. The walls of the inner casing are spaced from the walls of the outer one so as to provide flues or passages for air drafts as well as to receive one of the coils of the heating apparatus.

As shown in Figs. 1 to 4 inclusive, the front walls of the inner and outer casings are provided with doorways 12 and 13, the former of which leads into the ash pit 14, and the latter into the fire-box or chamber 15. Each of the doorways 12 and 13 is provided with a door 16, for closing the same, and each of said doors is preferably hinged at its top to the outer wall of the casing, so that it will be self-closing by means of its gravity. The inner casing 10, is provided on its front wall around each of the doorways 12 and 13, with an outwardly extended rib or boss 17, which rest against the inner surface of the front wall of the outer casing, so as to prevent the air between the walls of said casings passing into or through said doorways.

On each of its sides the casing 10 is provided just below the doorway 13, leading to the fire chamber with a horizontally extended shelf or partition 18, which extend from the front wall of the inner casing to the rear wall of the outer casing, and said inner casing has on its rear wall a horizontally extended partition 19, which extends from the rear end of one of the partitions 18, to the rear end of the other of said partitions, and rests against the inner surface of the rear wall of the outer casing. At a slight distance above the partition 19, the rear wall of the inner casing is provided with a transversely and horizontally disposed partition 20, which extends from one of the side walls to the other of the outer casing, and contacts with the rear wall of the last named casing. Extended along each of the side walls of the inner casing from the ends of the partition 20, and at a slight distance above the partitions 18, is a horizontal partition 21, which terminate at their front ends at a slight distance rearwardly of the front wall of the inner casing, or rather terminate rearwardly of the vertical flanges 22, which extend laterally and outwardly from the side walls of the inner casing to the side walls of the outer casing, as is clearly shown in Figs. 3 and 4 of the drawings.

By reference to Figs. 1 and 2, it will be seen that the top or upper end of the inner casing is located below the upper end of the outer casing, and that the vertical flanges 22 project upwardly so as to be about flush with the upper end of the outer casing. It will also be noted in said figures, as well as in Fig. 4, that each of the side walls of the inner casing is provided at its upper end with a horizontal partition 24, which extend outwardly against the inner surface of the side walls of the outer casing and rearwardly, but terminate forwardly of the rear wall of the inner casing. The front wall of the inner casing is provided in its upper portion with a recess 25, which is preferably V-shaped in order to receive the correspondingly shaped front end of a chute or flue 26, which is rearwardly tapered and is secured to the lower surface of the cover 27 for the top of the outer casing. This cover has on its front portion an opening 28, which corresponds in shape with the flue or chute 26, and said opening is closed by means of a door 29, which is hinged at its front end to the upper surface of said cover. The rear and side walls of the inner casing are provided respectively near their lower ends with horizontal partitions 30 and 31, which contact at their outer edges with the rear and side walls of the outer casing. Just above the partition 30, the rear wall of the inner casing is provided with an opening 32, and at a point between the partitions 19 and 20, the rear wall of the outer casing is provided with an opening 33, which leads into a vertical flue 34, with which the rear wall of the outer casing is provided, and in the upper portion of which flue is fitted a chimney 35, used for conducting the smoke and gases from the furnace to a chimney or flue in the building (not shown). Near its upper end the rear wall of the inner casing is provided with an opening 36, which leads into the upper portion of the flue 34, and is employed as an outlet when starting the fire in the furnace.

In the foregoing I have described the construction of my furnace casing, which is so built as to provide flues or draft passages for heated air which I utilize in heating the water of my water circulating system, and which air has heretofore been to a large extent wasted or not utilized. In referring to the water or steam circulating system, I will for the sake of brevity designate certain groups or sections of pipes as "coils," but by so doing I do not desire to be understood as limiting myself to coils or loops of pipes arranged in sections or groups, but I wish it to be understood that I employ the term coil or coils as indicating either a series of pipe coils, pipe loops or a number of pipes communicating one with the other and assembled in a body, which body may have communication with one or more coils or bodies of said construction.

Located between the rear walls and the side walls of the inner and outer casing and above the partitions 20 and 21, and below the partitions 24, is the primary coil, which I will designate as a whole by the reference numeral 37, and which consists of a pair of lower headers 38 and 39 respectively, which are placed transversely between the rear walls of the casings and one above the other, as shown. The header 38 is by preference of less diameter than the header 39, and rests on the partition 20, and has communication near one of its ends by means of a pipe 40, with a supply tank 41, which may be supported in any suitable manner near the rear portion of the furnace. The header 38 has communication near its other end by means of a pipe 42, with a pipe 43, which communicates with the upper portion of the tank 41. Each of the pipes 40 and 42 is equipped with a valve 44, to control the flow of water or fluid therethrough.

Extended horizontally and forwardly from the header 38, near each of its ends, is a pipe 45, each of which communicates at its front end with a pipe 46, which latter pipes communicate at their rear ends with the header 39, near each of its ends. The pipes 46, as well as the pipes 45, are located between the side walls of the inner and outer casings. Extended upwardly from the pipes 46, and also from the header 39, are a series of tubes 47 and 48, the former of which communicate at their upper ends with horizontally disposed tubes 49, located between the side walls of the casings just below the partition 24, and the latter with a header 50, located transversely between the rear walls of the casings and near their upper ends. The rear ends of the tubes 49, communicate with the header 50, near its ends and said header is provided with a tube or pipe 51, which extends upwardly through the top of the outer casing and communicates with another pipe, as will be presently explained.

Leading from the header 50 near each of its ends and forwardly of the furnace, yet between the side walls of the inner casing, is a pipe 52, each of which communicates at its front end with a vertical pipe 53, located just inside of the front wall of the inner casing. Each of the pipes 53 communicates at its lower end with a horizontally disposed header 54, which are located near the side walls of the inner casing and extend from near the front wall thereof to near its rear wall, at which point the headers 54 communicate with a header 55, which is transversely and horizontally located within the inner casing. Extended upwardly from each of the headers 54 are a series of tubes 56, which communicate at their upper ends with horizontal headers 57, located above the headers 54, and which communicate at their rear ends with a transverse horizontal header 58, which has communication through a series of pipes 59, with the header 55, at the lower rear portion of the secondary coil, which includes those parts above described located within the inner casing. Extended upwardly from the central portion of the header 58, through the top of the outer casing is a pipe 59, which communicates with another pipe, as will be presently explained. The third coil of my water circulating system is indicated as a whole by the reference numeral 60, and lies mainly within the pit of the fire-chamber, and consists of a series of layers or coils of pipe 61, which are formed so as to be located near the wall of the inner casing, as is clearly shown in Figs. 1 and 2 of the drawings. The lowermost layer or coil 61, of the third coil has communication through a pipe 62, with the header 58, of the secondary coil, at about the middle of said header. The uppermost layer of pipe 61 of the coil 60, has communication with a header 63, which is horizontally located a slight distance in front of the header 55 and in parallelism therewith. The header 63 has communication through a series of pipes 64, with a header 65, which is located horizontally and transversely within the inner casing just above the doorway 13 thereof, and said header 65 has communication through a series of pipes 66, with a header 67, which is located transversely in the upper portion of the inner casing near the rear wall thereof, and said header has extended upwardly therefrom through the top of the outer casing a pair of pipes 68, which are connected together by means of a coupling 70, the stem or upper portion 71 of which is equipped with a T-coupling 72, from which a service pipe 73 leads to the piping system (not shown), in which the radiators are located. The T-coupling 72 has mounted thereon a cylinder 74, in which is located a plunger 75, which has a rod 76, extended through the upper end of the cylinder and pivotally connected to a lever 77, which is fulcrumed on an upright 78, supported at its lower end on a bracket 79, on the T-coupling 72. One end of the lever 77, is loosely connected by means of a rod 80, to the draft-door 29, which closes the opening 28, in the top of the furnace casing. The opposite end of the lever 72, is loosely connected by means of rods 81 to arms 82, extended forwardly from bars 83, one of which is located on each side of the smoke stack 35, and which bars are fixed at their upper ends to a shaft 84, extended horizontally through the stack 35, and carries a damper 85, to regulate the draft through the smoke stack or flue. Each of the bars 83 has adjustably secured on its lower portion a weight 86, to act as governors and to normally hold the damper 85 in its open position.

Leading from the service pipe 73, is a pipe 87, which communicates with the tank 41, and has communication through a branch pipe 88, with the pipes 51 and 59, which, as before stated, extend upwardly through the cover or top of the outer casing of the furnace. The pipe 87 is provided with a valve 89, and the pipes 51 and 59 are provided with valves 90, and 91, respectively, which valves are used for controlling the flow of air, water or steam through said pipes.

Located at any suitable elevated point is a reserve tank or reservoir 92, which has communication through a pipe 93, with a supply of water, which pipe is provided with a valve 94, and has communication through a pipe 95, and a coupling 96, with the lower portion of the tank 41. The reservoir 92 also has communication through a pipe 97, with the lower portion of the tank 41, and said pipe is provided with a valve 98, for controlling the passage of water through the same.

The operation of the apparatus is simple and as follows: Water is supplied to the reservoir 92, and supply tank 41, from the source of supply through the pipes 93 and 95, and as it is fed into the tank 41, it will pass therefrom through the pipe 40, into the primary coil 37, and from thence through the pipes 52, forwardly and downwardly into the secondary coil, and from thence through the pipe 62, into the third or lowermost coil, and from thence upwardly in a zig-zag course through the fourth coil or pipes 64 and 66, and out through the pipes 68, and thence through the service pipe 73, to the radiators or heating system, from which it will return through the pipes 88ª and 42, into the proper coils for continuous circulation. In starting the fire in the furnace, the draft is admitted through the doorway 12, of the ash box so as to pass up through the grate and fire chamber and out through the opening 36 in the rear upper portion of the inner casing, from whence it will pass into the flue 34, and out through the stack 35, to a chimney flue or other suitable place of discharge. After the fire has been started, it is evident that the air remaining between the walls of the inner and outer casings will become heated and will heat the water as it enters the primary coil and ascends therein, and will continue to heat it until it passes through the pipes 52 into the fire chamber, where it will be subjected to the direct heat of the fire in its circulation around and within the fire chamber, and in its descent to the third coil in the pit of the fire box, from which it will leave in a very hot condition and will pass through the zig-zag coil in the fire chamber, which coil will act to force the water through the circulating system and from which it will be supplied as above stated through the service pipe to the heating or radiating systems in the house. As the water becomes heated, pressure thereof will operate the piston or plunger 75, so as to tilt the lever 77, thus regulating the draft which enters the opening 28, in the cover or top of the furnace. As the air enters said opening it will pass through the chute 26, and from thence between the front walls of the casing, and from thence rearwardly along the lower portion of the side walls, and from thence between the rear walls of the casing, and through the opening 32, into the ash pit, and from thence up through the fire chamber and over the side and rear walls of the inner casing, thence downwardly and forwardly over the partitions 21, and thence rearwardly between said partitions and the partitions 18 to the channel afforded by the partitions 19 and 20, between the rear walls of the casing, and thence out through the opening 33, into the flue 34 and stack 35 or chimney. By this arrangement of the passageways for the air between the inner and outer casings of the furnace, it is evident that I utilize the heat which has heretofore been to a great extent wasted in heating the water as it enters and ascends in the primary coil.

As before stated, my heating apparatus is adapted for producing or furnishing heat through the agency of either hot water or steam, and when the latter is desired it is only necessary to diminish the supply of water to the piping system so as to permit of the generation and circulation of steam throughout the entire system instead of water.

Having thus fully described my invention, what I claim as new and desire to secure by Letters Patent, is—

1. The combination with a furnace-casing, of a water-circulating pipe-system arranged therein, the said system having means for the induction of water thereinto at a suitable point within the furnace-casing and for conducting it partially around and then upwardly within the casing, and then downwardly, and then partially around and upwardly, and again downwardly, and then entirely around and upwardly within the casing, and then upwardly in a zig-zag course, and then out through the top of the casing to a service pipe.

2. The combination with a furnace consisting of an inner and an outer casing having their walls spaced apart, of a water-circulating pipe-system arranged partly between said casings and partly within the inner one, the said system having means for the induction of water to the piping between the casings and for conducting it partially around and then upwardly between the casings, and then downwardly, and then partially around and upwardly, and again downwardly, and then entirely around and upwardly within the casings, and then upwardly in a zig-zag course, and then out through the top of the casings to a service pipe.

3. In a heating apparatus, a furnace consisting of an inner and an outer casing having their walls spaced apart and provided with a fire chamber a grate and an ash pit and having doorways leading to said chamber and pit, the outer casing being higher than the inner one, a vertical partition closing the space between each of the side walls of the casing at the front wall of the inner casing from the top of the outer casing to a point below the doorway to the fire chamber, a horizontal partition located between the side and rear walls of the casings at the lower ends of said vertical partitions, a horizontal partition located between the side and rear walls of the casings at a distance above the first named horizontal partition and terminating at their front ends rearwardly of said vertical partitions, a horizontal partition located between each of the side walls of the outer casing and the upper portion of each of the side walls of the inner casing and extended rearwardly from said vertical partitions but terminating forwardly of the rear walls, the outer casing having an opening in its rear wall leading to the space between the lower horizontal partitions and an opening in its upper rear portion, the inner casing having an opening in its rear wall below the lower horizontal partition, a flue conduit communicating with said openings in the outer casing, a cover for the outer casing having an opening therein, a chute or flue leading from said opening to the upper portion of the space between the front walls of the casings, and a door to close said opening.

4. The combination with a furnace-casing, of a water-circulating pipe system arranged therein, the said system having means for the induction of water thereinto within the casing and for conducting it partially around and then upwardly within the casing, and then downwardly, and then partially around and upwardly, and again downwardly, and then entirely around and upwardly within the casing, and then upwardly through the fire chamber and out through the top of the casing to a service pipe.

5. The combination with a furnace consisting of an inner and an outer casing having their walls spaced apart and provided between said walls with passages for the circulation of heated air, of a water-circulating pipe system consisting of a primary coil located between the upper portion of the side and rear walls of said casings and having means for the inlet of water thereto, a secondary coil located within the upper portion of the inner casing and having communication with the upper rear portion of the first named coil, a third coil located in the lower part of the fire chamber of the inner casing and having communication with the upper part of the secondary coil, and a fourth coil located in the fire chamber of the inner casing and having communication with the upper portion of the third coil and provided at its upper part with an outlet.

6. The combination with a furnace consisting of an inner and an outer casing having their walls spaced apart, of a water-circulating pipe system arranged partly between said casings and partly within the inner one, the said system having means for the induction of water to the piping between the casings and for conducting it partially around and then upwardly between the casings, and then downwardly, and then partially around and upwardly, and again downwardly, and then entirely around and upwardly within the casings, and then upwardly in the fire chamber, and then out through the top of the casing to a service pipe, the outer casing having on its rear wall a flue conduit, a stack communicating with said conduit, a damper in said stack.

7. In a heating apparatus, the combination with a furnace-casing having a fire chamber and an outlet for smoke and gases, of a water circulation pipe system located in said casing and having a coil located in the pit of the fire chamber, means for supplying water to said coil, and an outlet for the passage of water out through the casing, means located above said coil within the fire chamber and in communication with the outlet and said coil for increasing the circulation of water throughout said system.

CHARLES J. JOHNSON.

Witnesses:
  CHAS. C. TILLMAN,
  A. S. PHILLIPS.

Copies of this patent may be obtained for five cents each, by addressing the "Commissioner of Patents, Washington, D. C."